US012665228B2

(12) United States Patent
Son

(10) Patent No.: US 12,665,228 B2
(45) Date of Patent: Jun. 23, 2026

(54) BATTERY PACK

(71) Applicant: SAMSUNG SDI CO., LTD., Yongin-si (KR)

(72) Inventor: Cheolgi Son, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 23 days.

(21) Appl. No.: 18/493,315

(22) Filed: Oct. 24, 2023

(65) Prior Publication Data

US 2024/0322263 A1 Sep. 26, 2024

(30) Foreign Application Priority Data

Mar. 24, 2023 (KR) ........................ 10-2023-0038843

(51) Int. Cl.
H01M 10/42 (2006.01)
H01M 10/48 (2006.01)
(Continued)

(52) U.S. Cl.
CPC ..... H01M 10/425 (2013.01); H01M 10/4207 (2013.01); H01M 10/482 (2013.01); H01Q 1/38 (2013.01); H01Q 17/008 (2013.01); H01M 2010/4271 (2013.01); H01M 2010/4278 (2013.01)

(58) Field of Classification Search
CPC ........... H01M 10/425; H01M 10/4207; H01M 10/482
See application file for complete search history.

(56) References Cited

U.S. PATENT DOCUMENTS

2013/0244062 A1 * 9/2013 Teramoto ............ H01M 10/425
429/7
2015/0340888 A1 * 11/2015 Hofer ........................ G01N 7/00
374/143
(Continued)

FOREIGN PATENT DOCUMENTS

EP        4090040 A1 * 11/2022 ............... G01S 1/30
EP        4 135 151 A1    2/2023
(Continued)

OTHER PUBLICATIONS

Extended European Search Report issued in corresponding EP Application No. 23212452.9, dated Jun. 6, 2024, 5 pages.
(Continued)

*Primary Examiner* — Olatunji A Godo
(74) *Attorney, Agent, or Firm* — Womble Bond Dickinson (US) LLP

(57) ABSTRACT

A battery pack includes a plurality of battery modules, a battery module of the plurality of batter modules including at least one cell and a control circuit configured to manage the at least one cell, a main controller configured to wirelessly communicate with the control circuit, and a plurality of structures corresponding to the plurality of battery modules, a structure of the plurality of structures is configured to adjust signal intensity of a radio signal transmitted to the main controller from the control circuit of the battery module, wherein the structure is further configured to vary a degree of adjusting signal intensity of the radio signal according to a position of the battery module.

9 Claims, 8 Drawing Sheets

(51) Int. Cl.
    *H01Q 1/38*       (2006.01)
    *H01Q 17/00*     (2006.01)

(56)           References Cited

U.S. PATENT DOCUMENTS

| | | | |
|---|---|---|---|
| 2019/0242949 A1* | 8/2019 | Lemkin | H01M 10/42 |
| 2019/0260097 A1 | 8/2019 | Kwon et al. | |
| 2020/0200828 A1 | 6/2020 | Sung | |
| 2021/0175942 A1 | 6/2021 | Maki | |
| 2021/0210803 A1 | 7/2021 | Aoki et al. | |
| 2022/0278379 A1 | 9/2022 | Hwang | |
| 2023/0054678 A1* | 2/2023 | Hwang | H01M 10/4207 |
| 2023/0088301 A1* | 3/2023 | Suzuki | G01R 31/396 |
| | | | 702/63 |
| 2023/0232249 A1* | 7/2023 | Kim | H04B 17/336 |
| | | | 370/329 |
| 2024/0356346 A1* | 10/2024 | Lee | H01M 10/42 |

FOREIGN PATENT DOCUMENTS

| | | | | | |
|---|---|---|---|---|---|
| EP | 3 934 144 B1 | | 3/2023 | | |
| JP | 2019527528 A | * | 9/2019 | ......... | G01R 31/3842 |
| JP | 2020-501481 A | | 1/2020 | | |
| JP | 2020051481 A | * | 4/2020 | ............ | F16H 41/24 |
| KR | 10-2155331 B1 | | 9/2020 | | |
| KR | 10-2020-0144376 A | | 12/2020 | | |
| KR | 10-2021-0016798 A | | 2/2021 | | |
| KR | 10-2255494 B1 | | 5/2021 | | |

OTHER PUBLICATIONS

Korean Office Action issued in corresponding KR Application No. 10-2023-0038843, dated Feb. 12, 2025, 6 pages.
EPO Office Communication for the corresponding EP Application No. 23212452.9, dated Apr. 23, 2025, 3 pages.
Notice of Allowance issued in corresponding Korean Patent Application No. 10-2023-0038843, dated Oct. 24, 2025, 2 pages.

* cited by examiner

BATTERY PACK

CROSS-REFERENCE TO RELATED APPLICATION

This application claims priority to and the benefit of Korean Patent Application No. 10-2023-0038843, filed in the Korean Intellectual Property Office on Mar. 24, 2023, the entire content of which is incorporated herein by reference.

BACKGROUND

1. Field

The present disclosure relates to a battery pack.

2. Description of the Related Art

A rechargeable or secondary battery is different from a primary battery for providing a non-reversible transformation of a chemical material into electrical energy in that the rechargeable battery may repeat charging and discharging. A low-capacity rechargeable battery is used as a power supply device for small electronic devices such as portable telephones, laptops computers, and camcorders, and a high-capacity rechargeable battery is used as a power supply device for an energy storage system (ESS) or uninterruptible power supply (UPS) using medium or large batteries used for electric vehicles (EVs), hybrid vehicles (HVs), for home or industry system, etc.

In general, the rechargeable battery includes an electrode assembly including a positive electrode, a negative electrode, and a separator provided between the positive electrode and the negative electrode, a case for receiving the electrode assembly, and an electrode terminal electrically connected to the electrode assembly. An electrolyte solution is injected into a case so as to allow the battery to be charged and discharged by the positive electrode, the negative electrode, and an electrochemical reaction of an electrolyte solution. A shape of the case, such as a cylinder or a rectangle, is changeable depending on the use of the battery.

The rechargeable battery may be used in the form of a battery module including a plurality of unit battery cells connected in series and/or in parallel, thereby providing high energy density for powering, e.g., a hybrid vehicle. That is, the battery module is, for example, formed by interconnecting electrode terminals of a plurality of unit battery cells according to an amount of power required to implement a high-power rechargeable battery for an electric vehicle. One or more battery modules may be mechanically and electrically integrated to form a battery system.

It is not sufficient to statically manage output and discharge of the battery power in order to satisfy dynamic power demands of various electricity consumers connected to the battery pack. Accordingly, information is steadily or intermittently exchanged between the battery pack and the controllers of electricity consumers. This information includes an actual state of charge (SoC) of the battery pack, potential electrical performance, charging capability, internal resistance, and actual or predicted power demand or consumer surplus.

To monitor, control, and/or set the above-noted parameters, the battery pack includes control devices, for example, a battery system manager (BSM), a battery management system (BMS), a battery monitoring unit (BMU), a battery management module (BMM), and a system basis chip (SBC).

Recently, the cases where the control devices in the battery pack are designed to communicate by a radio communication method are increasing. When the control device of each battery module communicates with the main control device of the battery pack by wire, a communication connection between the control devices is made in a daisy chain structure, making it possible to identify connection orders and positions of the battery modules. However, when the control device of each battery module wirelessly communicates with the main control device of the battery pack, it is difficult for the main control device to grasp the connection orders and positions of the battery modules because they are not physically connected to each other.

The above information disclosed in this Background section is only for enhancement of understanding of the background of the invention and therefore it may contain information that does not form the prior art.

SUMMARY

Aspects of the present disclosure are directed to a battery pack for detecting positions of battery modules when control devices in the battery pack wirelessly communicate with each other.

According to some embodiments of the present disclosure, there is provided a battery pack including: a plurality of battery modules, a battery module of the plurality of batter modules including at least one cell and a control circuit configured to manage the at least one cell; a main controller configured to wirelessly communicate with the control circuit; and a plurality of structures corresponding to the plurality of battery modules, a structure of the plurality of structures is configured to adjust signal intensity of a radio signal transmitted to the main controller from the control circuit of the battery module, wherein the structure is further configured to vary a degree of adjusting signal intensity of the radio signal according to a position of the battery module.

In some embodiments, the main controller is further configured to identify a position or a connection order of the battery module based on a received signal intensity of the radio signal received from the control circuit.

In some embodiments, the structure includes a shield filter.

In some embodiments, at least one of a surface shape, a component, and a thickness of a conductive material of the shield filter of the structure is different from one or more corresponding parameters of another structure of the plurality of structures.

In some embodiments, the structure includes an antenna module connected to the control circuit.

In some embodiments, at least one of a size, an area, a component, and a shape of an antenna pattern of the antenna module is different from one or more corresponding patterns of another antenna module of another structure of the plurality of structures.

In some embodiments, the structure includes a noise generator configured to generates a noise signal for addition to the radio signal.

In some embodiments, an output power of the noise signal that is output by the noise generator is different from that of another noise signal of a corresponding noise generator of another structure of the plurality of structures.

According to some embodiments of the present disclosure, there is provided a battery pack including: a plurality of battery modules, a battery module of the plurality of batter modules including at least one cell and a control circuit configured to manage the at least one cell; a main controller configured to wirelessly communicate with the control circuit; and a plurality of signal generators respectively corresponding to the plurality of battery modules, a signal generator of the plurality of signal generators is configured to generate a voltage signal having a voltage value that varies according to a position or a connection order of the battery module, wherein the control circuit is further configured to acquire position identification information based on the voltage signal of the signal generator, and to transmit a radio signal including the position identification information to the main controller.

In some embodiments, the main controller is further configured to identify a position or a connection order of the battery module based on the position identification information detected from the radio signal.

In some embodiments, the signal generator includes a voltage dividing circuit for generating the voltage signal.

In some embodiments, the voltage dividing circuit includes resistors having resistances that are different from one another.

In some embodiments, the signal generator further include an analog-to-digital converter for transmitting the voltage signal to the control circuit.

According to the embodiment, the position of the battery module may be detected when communication between the control devices in the battery pack is performed wirelessly.

Other aspects, features, and characteristics that are not described above will be more clearly understood from the accompanying drawings, claims, and detailed description.

BRIEF DESCRIPTION OF THE DRAWINGS

FIG. 1 shows a configuration diagram of a battery pack according to some embodiments of the present disclosure.

DETAILED DESCRIPTION

Figure 2:
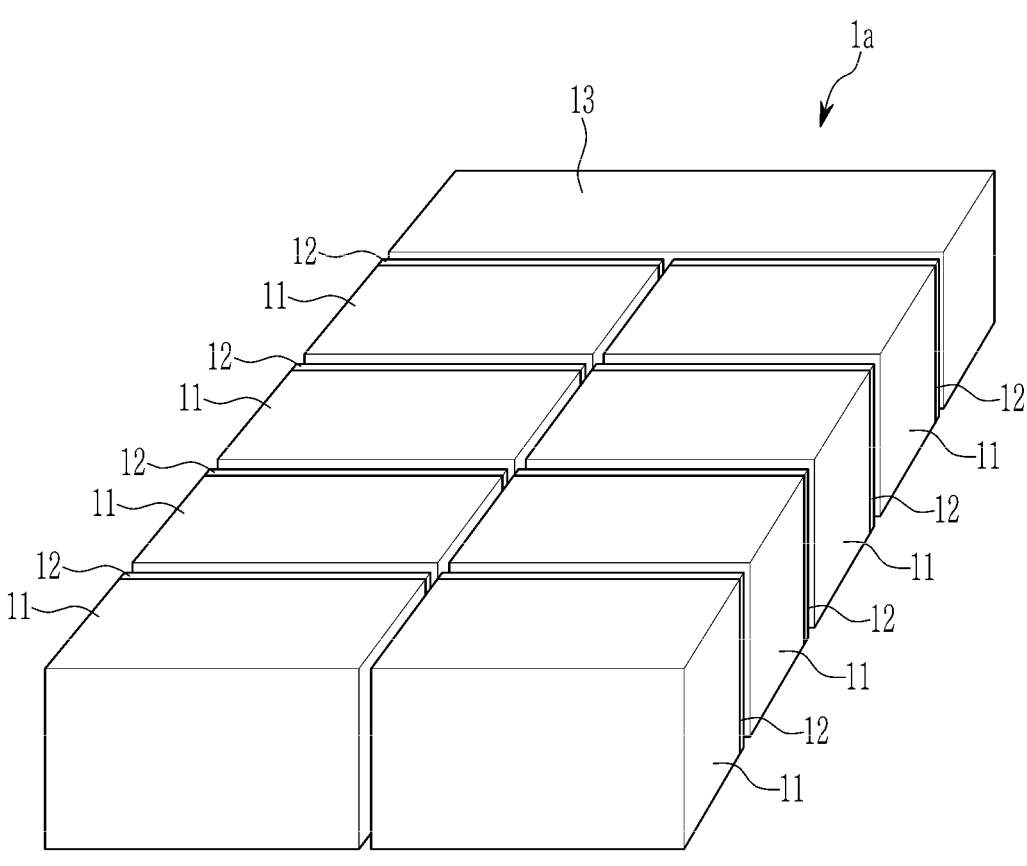
FIG. 2 shows a disposition structure of a battery module and structures in a battery pack according to some embodiments of the present disclosure.

Hereinafter, embodiments of the present disclosure will be described in detail with reference to the accompanying drawings. An operational effect and a method of implementing the same according to some embodiments of the present disclosure will be described with reference to the accompanying drawings. In the drawings, the same reference numerals denote the same elements, and redundant explanations may be omitted. However, the present disclosure may be embodied in various forms, and should not be construed as being limited only to the embodiments shown herein. Rather, these embodiments are provided by way of example to make the present disclosure thorough and complete, and will fully convey aspects and features of the present disclosure to those skilled in the art.

Accordingly, processes, elements, and techniques deemed not necessary to those skilled in the art for complete understanding of aspects and features may not be described. The relative sizes of elements, layers, and regions may be exaggerated for clarity.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept."

As used herein, the terms "use," "using," and "used" may be considered synonymous with the terms "utilize," "utilizing," and "utilized," respectively.

In the following description of embodiments of the present disclosure, terms in the singular form may include plural forms unless the context clearly indicates otherwise.

It will be understood that the terms "first" and "second" are used to describe various elements, but these elements should not be limited by these terms. These terms are only used to distinguish one element from another. For example, a first constituent element may be referred to as a second constituent element, and the second constituent element may be referred to as the first constituent element without departing from the scope of the present disclosure. As used herein, the term "and/or" includes any and all combinations of one or more related listed items. An expression such as "at least one" precedes a list of elements, modifying the entire list of elements and not individual elements of the list.

As used in this specification, the terms "substantially", "approximately", and similar terms are used as approximate terms but are not used as degree terms, and they are not intended to illustrate inherent deviations of measured or calculated values evident to those skilled in the art. In addition, when the term "substantially" is used in combination with a characteristic that can be expressed using numerical values, the term "substantially" refers to including a range of +/−5% of the value.

When one component or layer is described as "on", "connected", or "coupled" for other components or layers, "on", "connected" and "coupled" include all formed directly or by interposing one or more other components or layers. In addition, when it is disclosed that one component or a layer is "between" two components or layers, it should be appreciated that the corresponding component or layer is a single component or layer or there are one or more interposed other elements or layers.

Electric connection of two constituent elements includes not only a case where the two constituent elements are directly connected, but also a case where the two constituent elements are connected through another constituent element interposed therebetween. Other constituent elements may include a switch, a resistor, a capacitor, and the like. In describing the embodiments, the expression "connection" means electrical connection unless there is an expression "direct connection".

Figure 1:
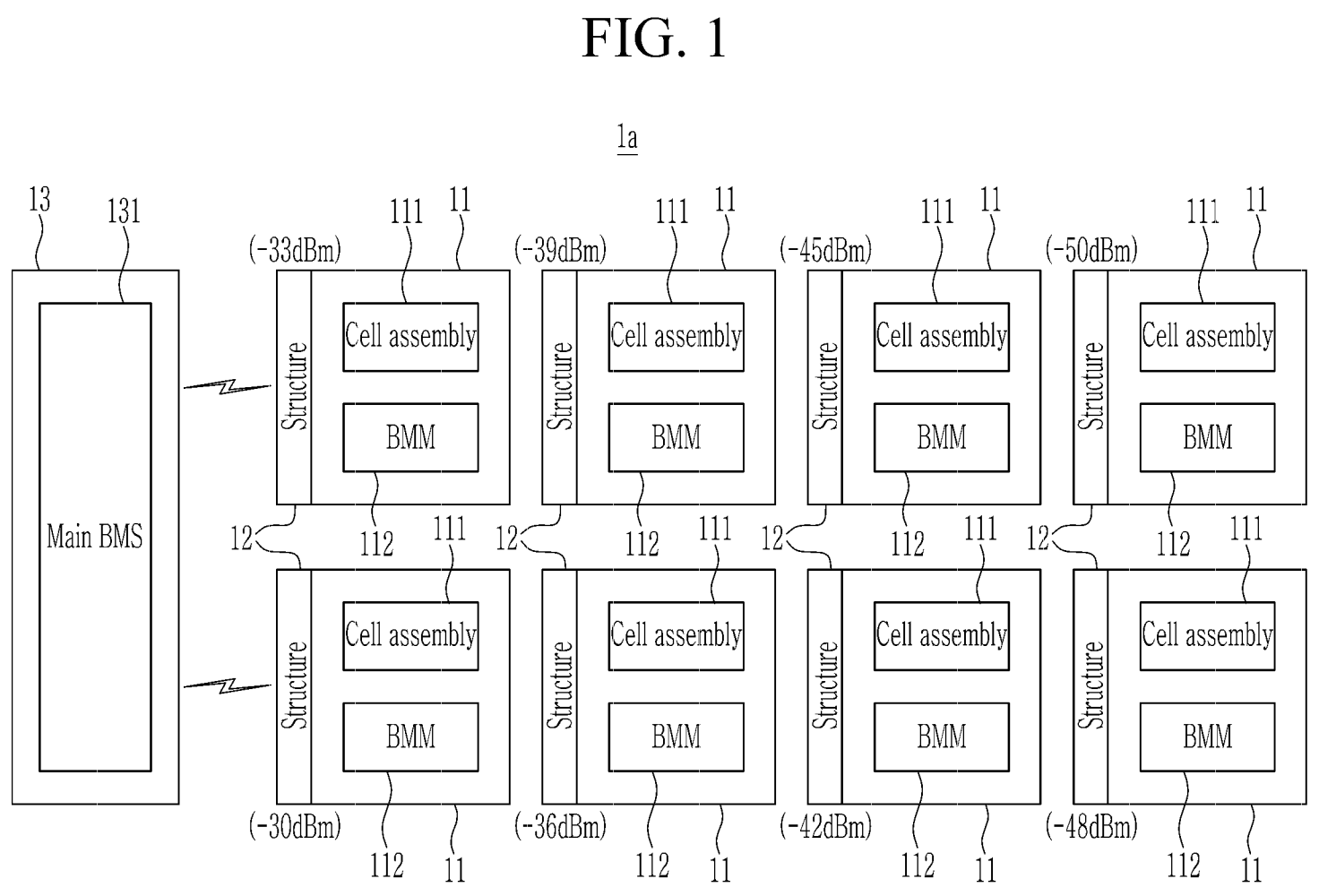

FIG. 1 shows a configuration diagram of a battery pack according to some embodiments of the present disclosure. FIG. 2 shows a disposition structure of a battery module and structures in a battery pack according to some embodiments of the present disclosure.

Referring to FIG. 1 and FIG. 2, the battery pack 1a may include a plurality of battery modules 11 and a control module (e.g., control system) 13.

Each of the battery modules 11 may include a cell assembly 111 including at least one cell connected to each other in series and/or in parallel. Each of the battery modules 11 may include a control device (e.g., a battery controller or control circuit, such as the BMM 112 of FIG. 1) for monitoring and managing states (such as voltage, current, temperature, etc.) of the corresponding cell assembly 111.

The control module 13 may include a main control device (e.g., a main controller or control circuit, such as the main BMS 131 of FIG. 1) for controlling general operations such as charge and discharge, balancing, diagnosis of the battery pack 1a.

The main BMS 131 uses state information (such as voltage, current, temperature, etc.) of the corresponding battery module 11 for the purpose of charge and discharge control, cell balancing control, and diagnosis. Therefore, the main BMS 131 may receive information on the battery modules 11 from the corresponding BMMs 112 by communication.

The main BMS 131 may communicate with the BMMs 112 of the battery modules 11 by radio communication. For example, the main BMS 131 may communicate with the BMMs 112 of the battery modules 11 by a radio communication method such as via Wi-Fi, Bluetooth, or Zigbee.

In some embodiments, the battery pack 1a further includes a plurality of structures 12 to adjust signal intensity of radio signals (or information) transmitted to the main BMS 131 from the BMMs 112.

Equation 1 expresses a method for calculating a signal-to-noise ratio (SNR) for the respective main BMSs 131 to determine intensity (i.e., sensitivity) of the signals received from the respective BMMs 112.

$$SNR_{dB} = 10\log_{10}\frac{P_S}{N_S} \qquad \text{[Equation 1]}$$

Here, $P_S$ represents average signal power, and $N_S$ indicates average noise power.

The respective structures 12 may adjust the signal intensity (i.e., the signal sensitivity) of the signal transmitted to the main BMS 131 (which corresponding to the SNR of the received signal) from the BMM 112 of the corresponding battery module 11 by artificially adjusting the $N_S$ of Equation 1 by generating noise.

In some embodiments, in order for the main BMS 131 to identify the position (or a connection order) of the corresponding battery modules 11 based on the signal received wirelessly from the BMMs 112, the structures 12 may vary adjustment degrees of signal intensity according to the position (or a connection order) where the corresponding battery module 11 is disposed in the battery pack 1a.

The farther the corresponding battery module 11 is disposed from the main BMS 131, or the closer the corresponding battery module 11 is connected to a negative output terminal of the battery pack 1a (or the farther it is connected from a positive output terminal of the battery pack 1a), the respective structures 12 may be configured to increase $N_S$.

Referring to FIG. 1, the noise $N_S$ generated by the each of the structures 12 may be different depending on the position (or the connection order) of the battery module 11, and may be about −30 dBm, −33 dBm, −36 dBm, −39 dBm, −42 dBm, −45 dBm, −48 dBm, and −50 dBm based on the order shown in FIG. 1. In the example of FIG. 1, the battery module 11 closest to the negative output of the battery pack 1a may generate noise $N_S$ of about −33 dBm, and the battery module 11 that is in the same row but furthest away the negative output may generate noise $N_S$ of about −50 dBm. Further, the battery module 11 on a second row and closest to the positive output of the battery pack 1a may generate noise $N_S$ of about −30 dBm, and the battery module 11 that is in the same row but furthest away the positive output may generate noise $N_S$ of about −48 dBm.

The structures 12 may be disposed on a path through which radio signals are transmitted to the main BMS 131 from the respective BMMs 112. For example, the structures 12 may be disposed between the battery modules 11 and the control module 13. Referring to FIG. 2 as an example, the corresponding structures 12 may be coupled to opposite sides of the control modules 13 in the corresponding battery modules 11.

Each structure 12 may include a shield filter for adjusting radio signal intensity by using an electromagnetic wave characteristic.

Figure 3:
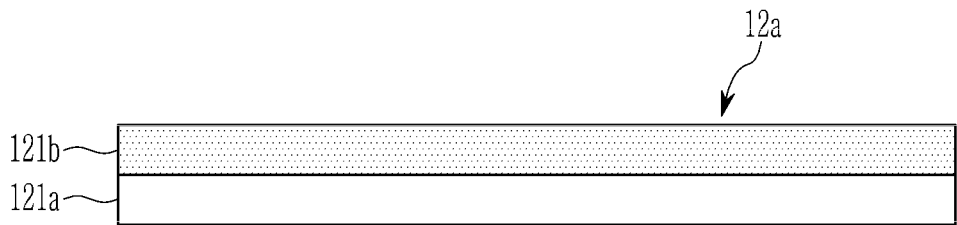
FIG. 3 shows a cross-sectional view of a shield filter according to some embodiments of the present disclosure.

FIG. 3 shows a cross-sectional view of a shield filter according to some embodiments of the present disclosure.

Referring to FIG. 3, the shield filter 12a may include a substrate 121a and a conductive material 121b disposed on one side of the substrate 121a. The shield filter 12a may adjust the signal intensity of radio signals passing through the shield filter through reflection, scattering, diffraction, and absorption of electromagnetic waves by the conductive material 121b. The conductive material 121b may include an amorphous alloy. Surface shapes, components, and thicknesses of the conductive material 121b of the shield filters 12a may be differently configured in order to vary the adjustment degrees of signal intensity according to the position (or a connection order) of the corresponding battery module 11 in the battery pack 1a.

The structures 12 may be antenna structures for transmitting radio signals to the main BMS 131 from the respective BMMs 112. In this case, each of the structures 12 are connected to a communication device (e.g., a communication circuit) of the corresponding BMM 112, and may wirelessly transmit signals generated by the corresponding BMMs 112 to the main BMS 131.

Figure 4:
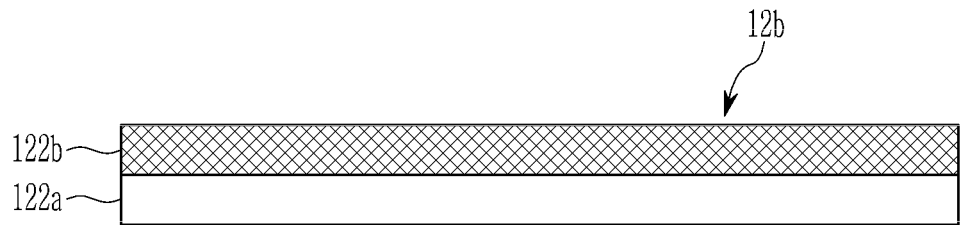
FIG. 4 shows a cross-sectional view of an antenna structure according to some embodiments of the present disclosure.

FIG. 4 shows a cross-sectional view of an antenna structure according to some embodiments of the present disclosure.

Referring to FIG. 4, the antenna structure 12b may include a substrate 122a, and an antenna pattern 122b disposed on one side of the substrate 122a. The antenna pattern 122b may include a conductive wire disposed in a specific shape. Sizes, areas, components, and shapes of the antenna pattern 122b of the antenna structure 12b may be differently configured in order to vary the adjustment degrees of signal intensity according to the position (or the connection order) of the corresponding battery module 11 in the battery pack 1a.

Each of the structures 12 may include a noise generator for applying jamming signals (or noise signals) for signals transmitted to the main BMS 131 from the corresponding BMM 112. The noise generator may be configured to output a noise signal having different output power (or output intensity) according to a position (or a connection order) of the corresponding battery module 11 in the battery pack 1*a*.

The noise generator may be connected to the antenna module (e.g., antenna) of the corresponding BMM 112 and may directly apply a noise signal to the antenna module. The noise generator may apply the noise signal based on a signal interference method to the radio signal transmitted from the antenna module of the corresponding BMM 112.

As described above, the radio signals transmitted from the BMMs 112 may be received by the main BMS 131, with the signal intensity thereof adjusted by the respective structures 12. Therefore, when receiving radio signals from the individual BMMs 112, the main BMS 131 identifies from which battery module 11 the corresponding radio signal is transmitted based on the identification information included in the radio signals (i.e., identification information of the corresponding BMMs 112), and may identify the position (or the connection order) of the corresponding battery module 11 based on the received signal intensity of the radio signals.

In the related art, because the positions of the battery modules 11 including the BMMs 112 are different from each other, the radio signals transmitted to the main BMS 131 from the respective BMMs 112 may have slightly different received signal intensities. However, when the volume of the battery pack is not very large, the difference in received signal intensity due to the difference in the positions of the respective battery modules 11 may be very minute, and the main BMS 131 may have difficulty in identifying the same. Therefore, in some embodiments, as described above, discrimination (e.g., discernment) in the main BMS 131 may be increased by artificially adjusting the received signal intensities using structure 12 to increase the difference in received signal intensities for the different BMMs 112. In addition, by configuring the structure 12 that adjusts signal intensity separately from the battery module 11, it is not necessary to change the structure of the battery modules 11 or a setting value of the BMM 112 for the purpose of identifying positions in the manufacturing process, and the battery module 11 may be replaced without any additional work for identifying positions.

Figure 5:
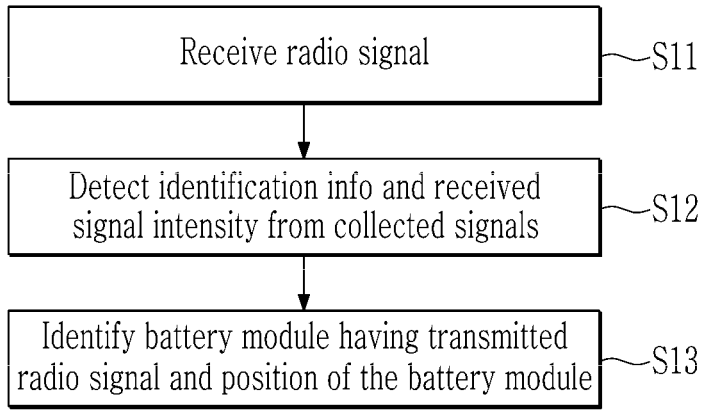
FIG. 5 shows a flowchart of a method for identifying positions of individual battery modules in a battery pack according to some embodiments of the present disclosure.

FIG. 5 shows a flowchart of a method for identifying positions of individual battery modules in a battery pack according to some embodiments of the present disclosure. The method of FIG. 5 may be performed by the main BMS 131 of the battery pack 1*a* described with reference to FIG. 1 to FIG. 4.

Referring to FIG. 5, when receiving a radio signal from one of the BMMs 112 (S11), the main BMS 131 may detect identification information (identification information of the BMM having transmitted the corresponding radio signal) and the received signal intensity from the received signal (S12). In addition, the main BMS 131 may identify the battery module 11 having transmitted the corresponding signal based on the identification information detected from the received signal, and may determine the position (or the connection order) of the corresponding battery module 11 based on the detected received signal intensity (S13).

When transmitting the radio signal to the main BMS 131, the individual BMMs 112 may include their identification information in the signal and may transmit the same. Accordingly, the main BMS 131 may detect identification information from the received signal and may identify the corresponding BMM 112 and the battery module 11 including the same according to the detected identification information.

The signals transmitted from the BMMs 112 may be transmitted to the main BMS 131 with their respective signal intensities adjusted by the corresponding structure 12. The adjustment degrees of signal intensity by the structures 12 may vary according to the position (or the connection order) of the battery module 11 corresponding to the respective structures 12. Therefore, the main BMS 131 may identify the corresponding BMM 112 and the position (or the connection order) of the battery module 11 including the corresponding BMM 112 according to the received signal intensity detected from the received signal. To this end, the main BMS 131 may predetermine and store a range of the received signal intensity corresponding to the position (or the connection order) of the battery module 11. The main BMS 131 may determine the position (or the connection order) of the corresponding battery module 11 by checking which position (or the connection order) in the range of the received signal intensity the signal intensity range of the received signal is included in.

Figure 6:
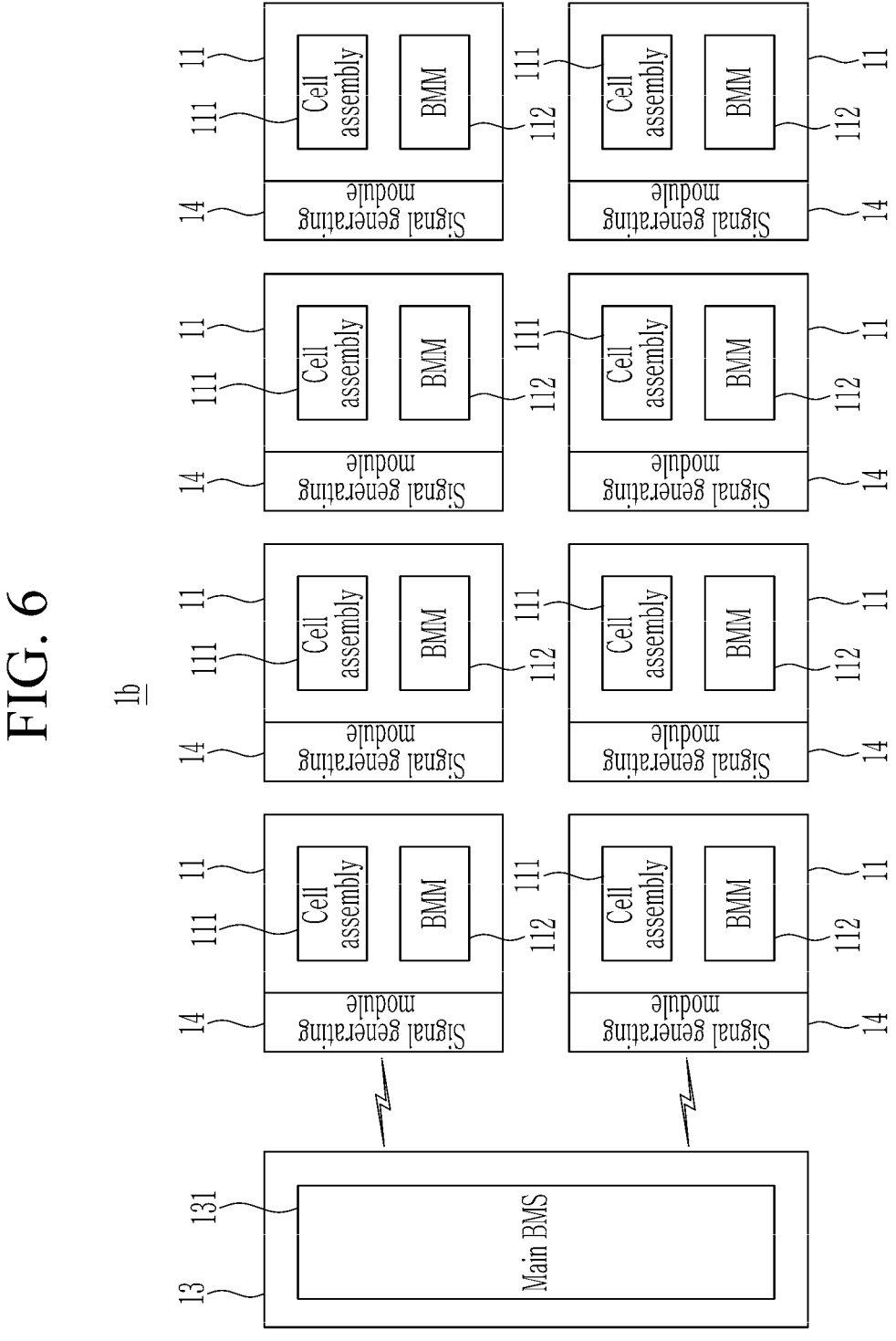
FIG. 6 shows a configuration diagram of a battery pack according to other embodiments of the present disclosure.
Figure 7:
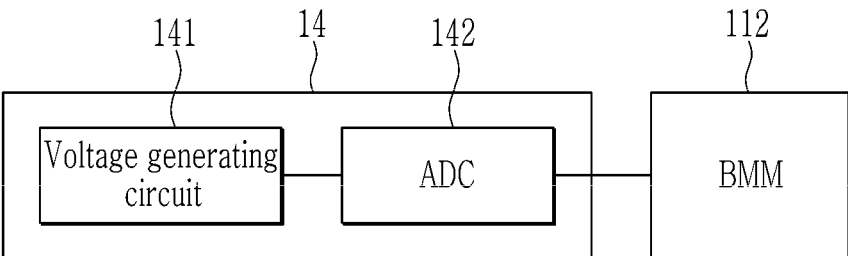
FIG. 7 shows a block diagram of a signal generating circuit of FIG. 6, according to some embodiments of the present disclosure.

FIG. 6 shows a configuration diagram of a battery pack according to some other embodiments of the present disclosure; and FIG. 7 shows a block diagram of a signal generating circuit of FIG. 6, according to some embodiments of the present disclosure.

Referring to FIG. 6 and FIG. 7, the battery pack 1*b* according to some other embodiments includes a plurality of battery modules 11 and a control module 13.

Each of the battery modules 11 may include a cell assembly 111 including a plurality of cells connected to each other in series and/or in parallel, and a control device (e.g., a controller or control circuit, such as the BMM 112 of FIG. 6) for monitoring and managing states (e.g., voltage, current, temperature, etc.) of the corresponding cell assembly 111.

The control module 13 may include a main control device (e.g., a main controller or control circuit, such as the main BMS 131 of FIG. 6) for controlling general operations of the battery pack 1*a* such as charging and discharging, balancing, and diagnosis.

The main BMS 131 and the BMMs 112 of the respective battery modules 11 may communicate with each other through radio communication.

In some embodiments, the battery pack 1*b* may further include a signal generating module (e.g., a signal generator) 14 for generating a signal whose value varies according to a position (or a connection order) of the corresponding battery module 11. The signal generating module 14 may include a voltage generating circuit 141 and an analog-to-digital converter (ADC) 142. The voltage generating circuit 141 may generate a voltage signal whose voltage value/level varies according to a position (or a connection order) of the corresponding battery module 11. For example, the voltage generating circuit 141 may include a voltage dividing circuit including a plurality of resistors. In this case, resistances of the resistors constituting the voltage generating circuit 141 may vary according to the position (or a connection order) of the corresponding battery module 11.

The voltage generating circuit 141 may be configured so that the voltage value of the output voltage signal increases the farther the corresponding battery module 11 is disposed from the main BMS 131, or the closer the corresponding battery module 11 is connected to the negative output terminal of the battery pack 1*b* (or the farther it is connected from the positive output terminal of battery pack 1*b*). The voltage generating circuit 141 may be configured so that the voltage value of the output voltage signal decreases the farther the corresponding battery module 11 is disposed from the main BMS 131, or the closer the corresponding battery module 11 is connected to the negative output terminal of the battery pack 1b (or the farther it is connected from the positive output terminal of the battery pack 1b).

The ADC 142 may convert the voltage signal generated by the voltage generating circuit 141 into a digital signal and may transmit the digital signal to a corresponding controller of the BMM 112. Upon receiving this, the controller of the BMM 112 may generate position identification information (e.g., a media access control (MAC) address) for indicating the position (or the connection order) of the corresponding battery module 11 according to the output signal of the ADC 142. In addition, each of the BMMs 112 may transmit a radio signal including the generated position identification information and its own identification information to the main BMS 131.

Accordingly, when receiving a radio signal from a BMM 112, the main BMS 131 may identify the battery module 11 having transmitted the radio signal based on the identification information (BMM identification information and position identification information) detected therefrom, and the position (or the connection order) of the battery module 11. To this end, the main BMS 131 may predetermine and store position identification information corresponding to the position of the battery module 11. The main BMS 131 may determine the position of the corresponding battery module 11 by comparing position identification information detected from the received signal and the stored position identification information.

FIG. 7 shows an example in which the signal generating module 14 includes the ADC 142; however, embodiments of the present disclosure are not limited thereto. For example, the ADC 142 may be included in the corresponding BMM 112 or in the controller of the BMM 112, rather than in the signal generating module 14. In such examples, the voltage signal generated by the voltage generating circuit 141 may be input to an ADC included in the corresponding BMM 112 or in the controller of the BMM 112.

Figure 8:
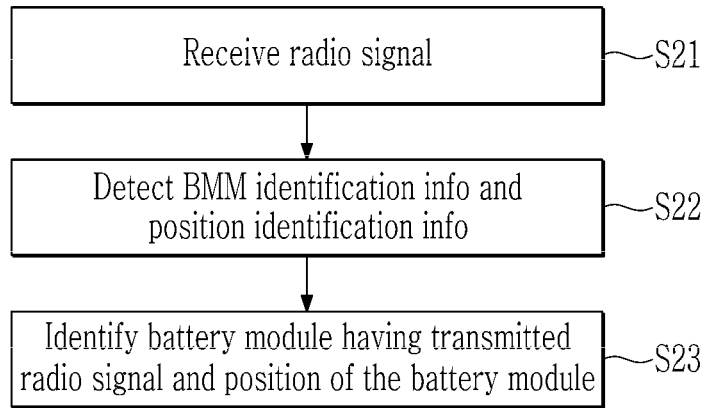
FIG. 8 shows a flowchart of a method for identifying positions of individual battery modules in a battery pack according to other embodiments of the present disclosure.

FIG. 8 shows a flowchart of a method for identifying positions of individual battery modules in a battery pack according to other embodiments of the present disclosure. The method of FIG. 8 may be performed by the main BMS 131 of the battery pack 1b described with reference to FIG. 6 and FIG. 7.

Referring to FIG. 8, when receiving a radio signal from any one of the BMMs 112 (S21), the main BMS 131 may detect identification information and position identification information of the corresponding BMM 112 from the received signal (S22). The main BMS 131 may identify the battery module 11 having transmitted the signal based on the identification information (e.g., BMM identification information and position identification information) detected from the received signal, and may identify the position (or the connection order) of the corresponding battery module 11 based on the detected received signal intensity (S23).

The BMMs 112 may generate position identification information indicating the position of the corresponding battery module 11 based on the output signal of the signal generating module 14 for generating a voltage signal whose voltage value varies according to the position of the corresponding battery module 11. A BMM 112 may transmit the position identification information generated in this way to the main BMS 131 along with its own identification information.

Accordingly, the main BMS 131 may detect BMM identification information from a signal received from a BMM 112 and may identify the corresponding BMM 112 and the battery module 11 including the same according to the detected BMM identification information. The main BMS 131 may detect position identification information from a signal received from a BMM 112, and may identify the corresponding BMM 112 and the position (or the connection order) of the battery module 11 including the same according to the detected position identification information.

According to the aforementioned embodiments, the main BMS 131 may automatically identify positions (or the connection order) of the respective battery modules 11 communicating wirelessly. Accordingly, when a replacement is required due to a failure of one battery module 11, the main BMS 131 transmits position information of the failed battery module 11 to a replacement device so that a worker or the replacement device may identify the position of battery module 11 to be replaced without the additional need to identify the position of the failed battery module 11.

Electronic or electrical devices according to embodiments of the present invention and/or other related devices or constituent elements may be realized by using appropriate hardware, firmware (e.g., an application-specific integrated circuit), software, or combinations of software, firmware, and hardware. For example, various configurations of the above-noted devices may be positioned on one integrated circuit (IC) chip or an individual IC chip. Various configurations of the above-noted devices may be realized on a flexible printed circuit film, a tape carrier package (TCP), a printed circuit board (PCB), or one substrate. The electrical or mutual connections described in the present specification may, for example, be realized by the PCB, wires on different types of circuit carriers, or conductive elements. The conductive elements may, for example, include metallization such as surface metallization and/or pins, and may include conductive polymers or ceramics. Electrical energy may be transmitted by electromagnetic radiation or a light-using radio access.

The various configurations of the devices may be performed by at least one processor so as to perform the above-described various functions, they may be performed in at least one computing device, and they may be processes or threads for performing computer program instructions and interacting with other system constituent elements. The computer program instruction is stored in a memory realizable in a computing device using a standard memory device such as a random access memory (RAM). The computer program instruction may also be stored in a non-transitory computer readable medium such as a CD-ROM or a flash drive.

A person of ordinary skill in the art must understand that various functions of the computing device may be combined or united to a single computing device, or functions of a specific computing device may be dispersed to at least another computing device while not digressing from the range of the embodiments of the present invention.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the present disclosure as defined by the appended claims, and equivalents thereof.

DESCRIPTION OF SYMBOLS 1a, 1b: battery pack
11: battery module

111: cell assembly
112: battery management module BMM
12: structure
12*a*: shield filter
121*a*: substrate of shield filter
121*b*: conductive material of shield filter
12*b*: antenna module
122*a*: substrate of antenna module
122*b*: antenna pattern of antenna module
13: control module
131: main battery management system BMS
14: signal generating module
141: voltage generating circuit
142: analog-to-digital converter ADC

What is claimed is:

1. A battery pack comprising:
a plurality of battery modules, a battery module of the plurality of battery modules comprising at least one cell and a control circuit configured to manage the at least one cell;
a main controller configured to wirelessly communicate with the control circuit; and
a plurality of structures corresponding to the plurality of battery modules, a structure of the plurality of structures being configured to adjust signal intensity of a radio signal transmitted to the main controller from the control circuit of the battery module,
wherein the structure is further configured to vary a degree of adjusting signal intensity of the radio signal relative to noise according to a position of the battery module,
wherein the structure comprises a noise generator configured to generates a noise signal for application to the radio signal, an output power of the noise signal that is output by the noise generator is different from that of another noise signal of a corresponding noise generator of another structure of the plurality of structures such that a signal to noise ratio of the radio signal is indicative of the position or a connection order of the battery module among the plurality of battery modules within the battery pack.

2. The battery pack as claimed in claim 1, wherein the main controller is further configured to identify the position or the connection order of the battery module based on a received signal intensity of the radio signal received from the control circuit.

3. A battery pack comprising:
a plurality of battery modules, each battery module of the plurlaity of battery modules comprising at least one cell and a control circuit configured to manage the at least one cell;
a main controller configured to wirelessly communicate with the control circuit of each battery module; and
a plurality of shield filters corresponding to the plurality of battery modules, each shield filter of the plurality of shield filters being configured to adjust a signal intensity of a radio signal transmitted from the control circuit of a corresponding battery module to the main controller,
wherein each shield filter is further configured to vary a degree of adjusting signal intensity of the radio signal according to a position or a connection order of the corresponding battery module, and
wherein each shield filter adjusts the signal intensity of the radio signal by at least one of reflection, scattering, diffraction, and absorption of electromagnetic waves.

4. The battery pack as claimed in claim 3, wherein:
each shield filter includes a substrate and a conductive material disposed on one surface of the substrate, and
the plurality of shield filters differ from each other in at least one of a surface shape, a component, and a thickness of the conductive material.

5. The battery pack as claimed in claim 1, wherein the structure comprises an antenna module connected to the control circuit.

6. The battery pack as claimed in claim 5, wherein at least one of a size, an area, a component, and a shape of an antenna pattern of the antenna module is different from one or more corresponding patterns of another antenna module of the another structure of the plurality of structures.

7. A battery pack comprising:
a plurality of battery modules, a battery module of the plurality of batter modules comprising at least one cell and a control circuit configured to manage the at least one cell;
a main controller configured to wirelessly communicate with the control circuit; and
a plurality of signal generators respectively corresponding to the plurality of battery modules, each one of the plurality of signal generators comprising a voltage dividing circuit configured to generate a voltage signal having a voltage value that varies according to a position or a connection order of the battery module,
wherein the control circuit is further configured to acquire position identification information based on the voltage signal of the signal generator, and to transmit a radio signal comprising the position identification information to the main controller,
wherein resistances of the voltage dividing circuit of one of the plurality of signal generators is different from those of a corresponding voltage dividing circuit of another one of the signal generators.

8. The battery pack as claimed in claim 7, wherein the main controller is further configured to identify the position or the connection order of the battery module based on the position identification information detected from the radio signal.

9. The battery pack as claimed in claim 8, wherein each one of the signal generators further comprises an analog-to-digital converter for transmitting the voltage signal to the control circuit.

* * * * *